(12) United States Patent
Han et al.

(10) Patent No.: US 8,717,308 B2
(45) Date of Patent: May 6, 2014

(54) DISPLAY DEVICE WITH SERIES CONNECTED OPTICAL SENSORS FOR DETERMINING TOUCH POSITION

(75) Inventors: Min-Koo Han, Seoul (KR); Jae-Hoon Lee, Seoul (KR); Hyun-Sang Park, Seongnam-si (KR); Bong-Hyun You, Yongin-si (KR); Byoung-Jun Lee, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 640 days.

(21) Appl. No.: 12/469,132

(22) Filed: May 20, 2009

(65) Prior Publication Data

US 2009/0289915 A1 Nov. 26, 2009

(30) Foreign Application Priority Data

May 21, 2008 (KR) .................. 10-2008-0047214

(51) Int. Cl.
*G06F 3/041* (2006.01)
(52) U.S. Cl.
USPC ............................................... 345/173
(58) Field of Classification Search
USPC ............... 345/156, 173–178, 207; 178/18.03, 178/18.05–18.09
See application file for complete search history.

(56) References Cited

U.S. PATENT DOCUMENTS

| | | | | |
|---|---|---|---|---|
| 5,204,661 A | * | 4/1993 | Hack et al. | 345/88 |
| 5,608,205 A | * | 3/1997 | Bird et al. | 250/208.1 |
| 5,838,308 A | * | 11/1998 | Knapp et al. | 345/173 |
| 6,737,654 B2 | * | 5/2004 | Ducourant | 250/370.11 |
| 2004/0085463 A1 | * | 5/2004 | Sharma et al. | 348/231.99 |
| 2006/0033729 A1 | * | 2/2006 | Yoshida et al. | 345/207 |
| 2007/0063957 A1 | * | 3/2007 | Awakura et al. | 345/98 |
| 2007/0109239 A1 | * | 5/2007 | den Boer et al. | 345/87 |
| 2008/0007395 A1 | * | 1/2008 | Koide | 340/501 |
| 2008/0158184 A1 | * | 7/2008 | Land et al. | 345/173 |

FOREIGN PATENT DOCUMENTS

| | | |
|---|---|---|
| JP | 7-325319 | 12/1995 |
| KR | 10-2005-0038987 | 4/2005 |
| KR | 10-2007-0121283 | 12/2007 |

OTHER PUBLICATIONS

English Abstract for JP Patent Publication No. JP7325319, dated Dec. 12, 1995, 1 page.
English Abstract for KR Patent Publication No. 1020050038987, dated Apr. 29, 2005, 1 page.
English Abstract for KR Patent Publication No. 1020070121283, dated Dec. 27, 2007, 1 page.

* cited by examiner

*Primary Examiner* — Chanh Nguyen
*Assistant Examiner* — Ram Mistry
(74) *Attorney, Agent, or Firm* — Innovation Counsel LLP (57) ABSTRACT

A display device with a touch screen includes: first sensing units, each first sensing unit comprising first optical sensors connected in series, each first sensing unit comprising a first terminal for receiving a first voltage, each first sensing unit extending in a first direction; second sensing units, each second sensing unit comprising second optical sensors connected in series, each second sensing unit comprising a first terminal for receiving a second voltage, each second sensing unit extending in a second direction transverse to the first direction; a reset unit for applying a reset voltage to a second terminal of each of the first and second sensing units; and a read-out unit for sensing a touch position based on voltage changes at the second terminals of the first and second sensing units.

22 Claims, 10 Drawing Sheets

DISPLAY DEVICE WITH SERIES CONNECTED OPTICAL SENSORS FOR DETERMINING TOUCH POSITION

This application claims priority from South Korean Patent Application No. 10-2008-0047214 filed on May 21, 2008 in the Korean Intellectual Property Office, the disclosure of which is incorporated herein by reference in its entirety.

BACKGROUND OF THE INVENTION

1. Field of the Invention

The present invention relates to display devices with optical sensors. In some embodiments, the optical sensors can be used to easily and reliably implement a touch screen function.

2. Description of the Related Art

In display devices, a touch screen function provides an intuitive interface through which a user can easily input information. Therefore, display devices with the touch screen function are very popular.

The touch screen function can be implemented via optical sensing. In such implementation, each pixel of the display device includes an optical sensor which senses a change in the amount of light incident on the optical sensor when the optical sensor is touched by a finger. The change in the amount of light is then converted to a voltage. Optical sensing is considered to be of interest mainly for small-size display devices based on polycrystalline silicon (p-Si) because in display devices based on polycrystalline silicon PIN diodes can be used which have superior photosensitivity.

However, when the touch screen function is implemented in a p-Si display device that supports an image scanning function, the pixel circuitry may become complicated and vulnerable to noise. In addition, as the resolution of the p-Si display device increases, the amount of data that needs to be processed may increase. As a result, the signal processing time of the display device may increase.

Furthermore, there is a need for large-size display devices based on amorphous silicon (a-Si) and having the touch screen function.

SUMMARY

Some embodiments of the present disclosure of invention provide a display device having a touch screen function which can be easily implemented and operate in a reliable manner. Methods are also provided for driving such a display device.

Some embodiments provide a display device comprising: a plurality of first sensing units, each first sensing unit comprising first optical sensors connected in series to each other, each first sensing unit comprising a first terminal for receiving a first voltage, each first sensing unit extending in a first direction; a plurality of second sensing units, each second sensing unit comprising second optical sensors connected in series to each other, each second sensing unit comprising a first terminal for receiving a second voltage, each second sensing unit extending in a second direction transverse to the first direction; a reset unit which is connected to a second terminal of each of the first and second sensing units and is for applying a reset voltage to the second terminal of each of the first and second sensing units; and a read-out unit for sensing a touch position based on voltage changes at the second terminals of the first and second sensing units.

Some embodiments provide a display device comprising: a plurality of sensing units each of which comprises a plurality of optical sensors operating in a turn-off region, each of the sensing units having a capacitance for converting, into a voltage change, a change in an optical leakage current that flows through the sensing unit's optical sensors; a reset unit for applying a reset voltage to each of the sensing units; and a read-out unit for sensing a touch position based on the voltage change caused by touching at least one of the optical sensors.

Some embodiments provide a method of driving a display device, the method comprising: biasing a plurality of optical sensors included in each of a plurality of sensing units so that the optical sensors operate in a turn-off region; applying a reset voltage to a terminal of each of the sensing units; converting, into a voltage change, a change in an optical leakage current flowing through at least one of the optical sensors; and sensing a touch position based on the voltage changes at the terminals of the sensing units.

DESCRIPTION OF SOME EMBODIMENTS

Advantages and features of the present invention may be more readily understood by reference to the following detailed description of exemplary embodiments and the accompanying drawings. The present invention may, however, be embodied in many different forms and should not be construed as being limited to the embodiments set forth herein. Like reference numerals refer to like elements throughout the specification.

It will be understood that when an element is referred to as being "connected to" or "coupled to" another element, then intervening elements may or may not be present. In contrast, when an element is referred to as being "directly connected to" or "directly coupled to" another element, then there are no intervening elements.

It will be understood that terms like "first", "second", "third", etc., are merely reference labels which do not limit the invention. These terms are only used to distinguish one element, component or section from another element, component or section. Thus, these terms are interchangeable, e.g. a "first" element could be renamed as a "second" element, etc.

Now some embodiments of the present invention will be illustrated on the example of a liquid crystal display (LCD). However, the present invention is not limited to LCDs and may be applied to other types of display devices including for example plasma display panel devices (PDP) and organic light-emitting diode devices (OLED).

Figure 1:
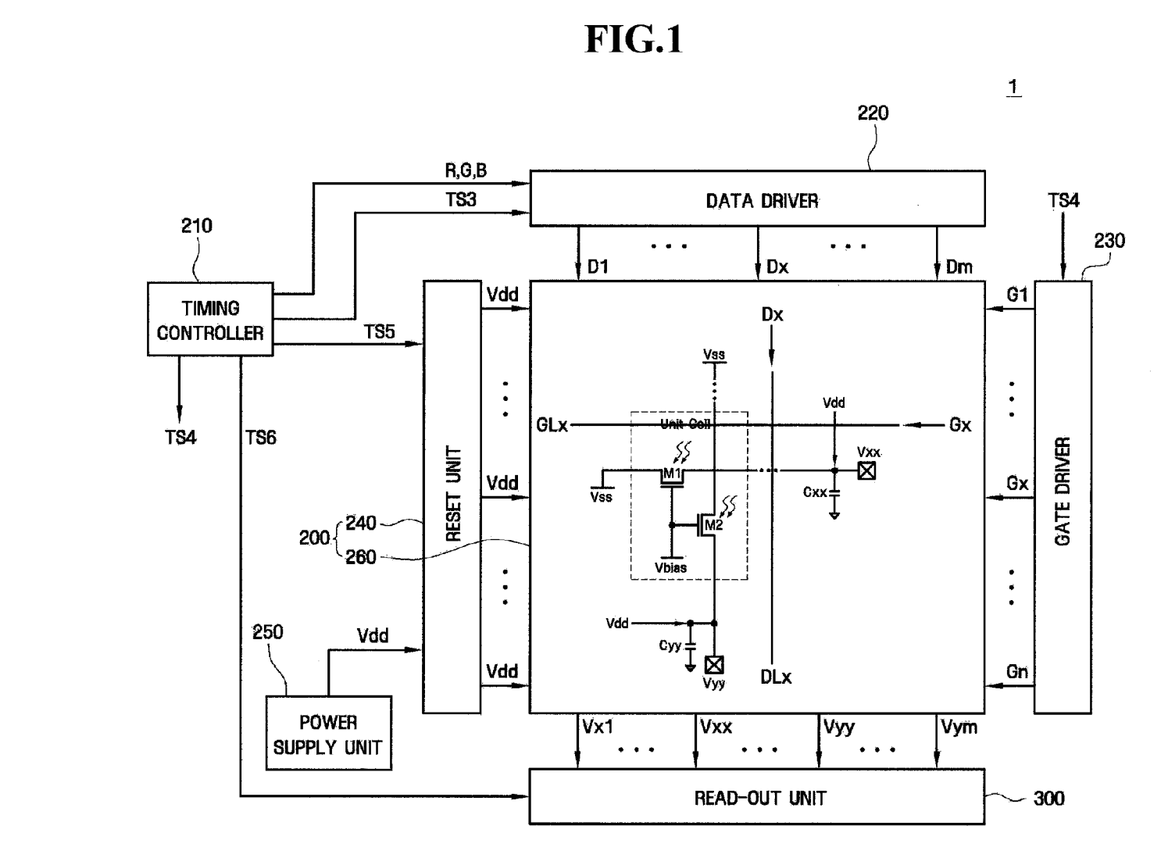
FIG. 1 is a block diagram illustrating a liquid crystal display (LCD) according to a first exemplary embodiment of the present invention.
Figure 2:
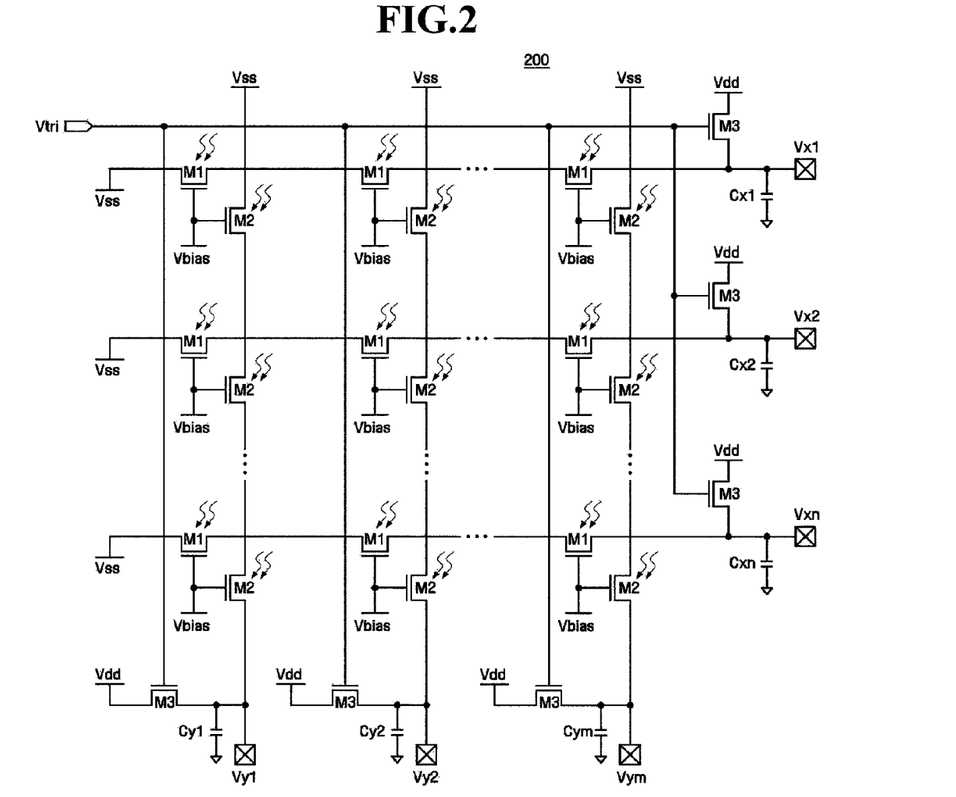
FIG. 2 is a circuit diagram of a sensor array in the LCD of FIG. 1.
Figure 3:
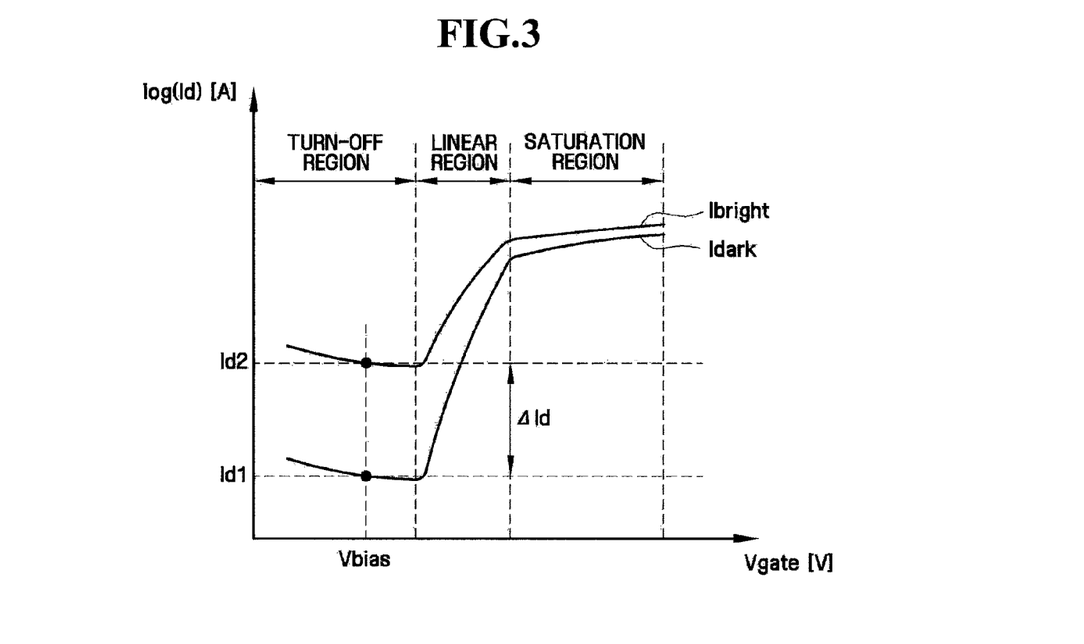
FIG. 3 is a graph of the drain current versus the gate voltage in an optical sensor used in the sensor array of FIG. 2.
Figure 4:
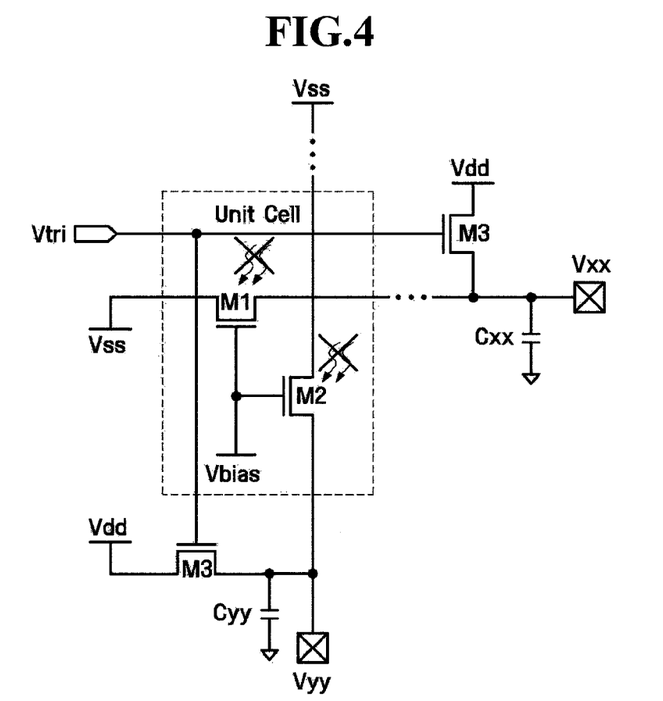
FIG. 4 is a circuit diagram of a unit cell used in the sensor array of FIG. 2.
Figure 5:
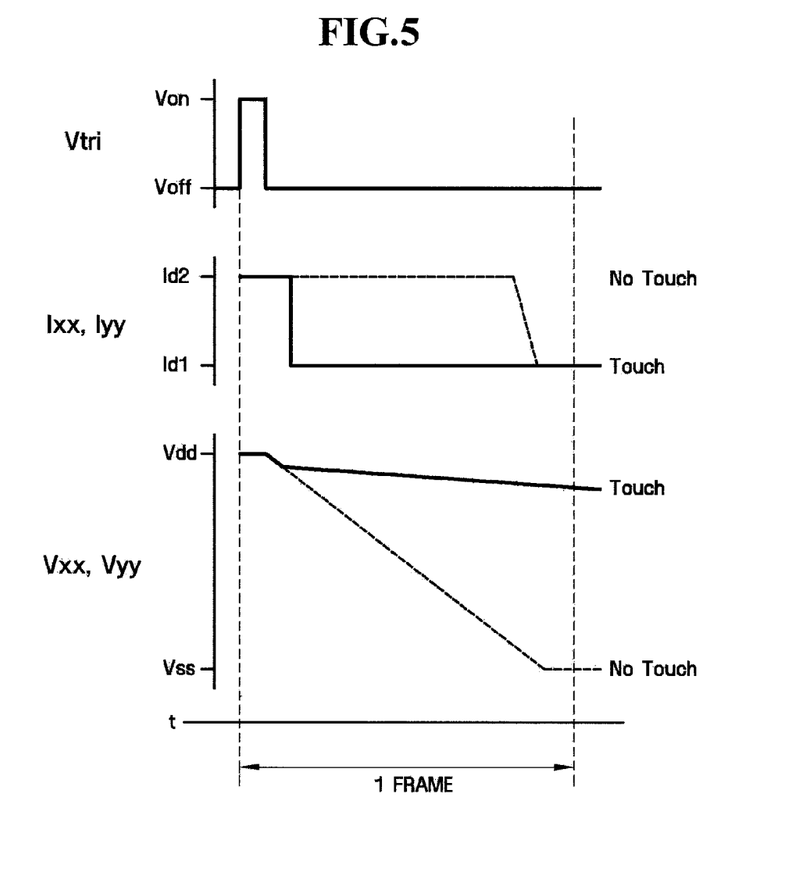
FIG. 5 illustrates timing diagrams for currents and voltages of sensing units which include unit cells such as shown in FIG. 4.
Figure 6:
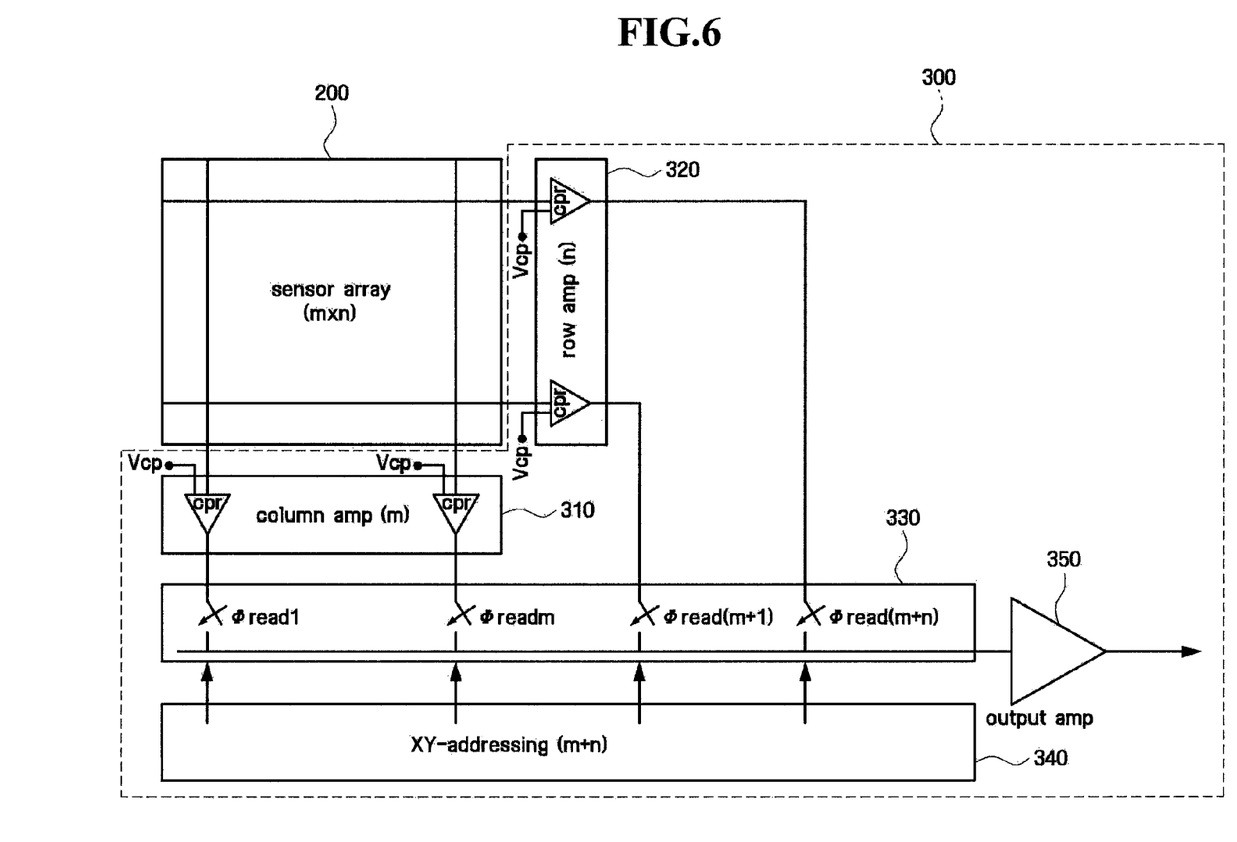
FIG. 6 is a block diagram of the sensor array and a read-out unit included in the LCD of FIG. 1.

An LCD 1 according to a first exemplary embodiment of the present invention is illustrated in FIGS. 1 through 6. FIG. 1 is a block diagram of the LCD 1. FIG. 2 is a circuit diagram of a sensor array 200 included in the LCD 1. FIG. 3 is a graph illustrating the operation of first and second optical sensors M1 and M2 shown in FIG. 2. FIG. 4 is a circuit diagram of a unit cell shown in FIG. 2. FIG. 5 shows timing diagrams of the current and voltage of first and second sensing units which include a unit cell such as shown in FIG. 4. FIG. 6 is a block diagram illustrating the sensor array 200 and a read-out unit 300 included in the LCD 1.

Referring to FIG. 1, the LCD 1 includes the sensor array 200 which includes a reset unit 240 and a sensing unit 260 having first and second sensing units. The LCD 1 also includes a timing controller 210, a data driver 220, a gate driver 230, a power supply unit 250, and the read-out unit 300.

The sensor array 200 includes a plurality of first sensing units and a plurality of second sensing units. However, for simplicity, FIG. 1 shows only a single unit cell, a single first sensing unit and a single second sensing unit.

Each unit cell includes a first optical sensor M1 and a second optical sensor M2. In the example of FIG. 1, the first and second optical sensors M1 and M2 are implemented as metal oxide semiconductor (MOS) transistors. A bias voltage Vbias is applied to the gate electrodes of the first optical sensor M1 and the second optical sensor M2.

As illustrated in FIG. 2, each first sensing unit may include first optical sensors M1 connected in series and extending in a first direction (e.g. horizontally). Each first sensing unit may have a first terminal receiving a first voltage Vss. Each second sensing unit may include second optical sensors M2 connected in series and extending in a second direction (e.g. vertically) transverse to the first direction. Each second sensing unit may have a first terminal receiving a second voltage Vss. The first voltage Vss may be equal to the second voltage Vss, and may be a ground voltage.

As shown in FIGS. 1 and 2, each first sensing unit may have a second terminal Vxx (shown as Vx1 to Vxn in FIG. 2) connected to a respective capacitor Cxx (Cx1 through Cxn in FIG. 2). Each second sensing unit may have a second terminal Vyy (shown as Vy1 to Vym in FIG. 2) connected to a respective capacitor Cyy (Cy1 through Cym in FIG. 2). The second terminals Vxx and Vyy are output terminals of the respective first and second sensing units.

The reset unit 240 applies a reset voltage Vdd received from the power supply unit 250 to the second terminals of the first and second sensing units.

In addition to the sensor array 200, the LCD 1 includes a pixel array for displaying an image. The pixel array includes gate lines receiving respective gate signals G1 through Gn, data lines receiving respective data signals D1 through Dm, thin-film transistor (TFT) regions (not shown) each of which is defined as a region where a respective one of the gate lines meets a respective one of the data lines. FIG. 1 shows only an $x^{th}$ gate line GLx (receiving the $x^{th}$ gate signal Gx) and an $x^{th}$ data line DLx (receiving the $x^{th}$ data signal Dx).

The timing controller 210 outputs image signals R, G and B and a third timing signal TS3 to the data driver 220, outputs a fourth timing signal TS4 to the gate driver 230, outputs a fifth timing signal TS5 to the reset unit 240, and outputs a sixth timing signal TS6 to the read-out unit 300.

Based on the third timing signal TS3, the data driver 220 transmits to the data lines the respective m data signals D1 through Dm which correspond to the image signals R, G and B.

The gate driver 230 sequentially transmits the n gate signals G1 through Gn to the respective gate lines based on the fourth timing signal TS4. In this operation, the n gate signals G1 through Gn may be transmitted at different points of time.

The reset unit 240 provides m+n reset voltages Vdd to the respective second terminals of the first sensing and second sensing units based on the fifth timing signal TS5. The fifth timing signal TS5 is used to control the initiation of the reset unit 240, and the m+n reset voltages Vdd may be simultaneously transmitted based on the fifth timing signal TS5, which will be described later with reference to FIG. 2.

The read-out unit 300 receives output signals from respective output terminals Vx1, . . . Vxx, Vy1, . . . , Vym of the first and second sensing units and senses the touch position based on the voltage changes of the output signals. In other words, the read-out unit 300 may sense the touch position based on the voltage changes at the second terminals of the first and second sensing units. The sixth timing signal TS6 is used to control the initiation of the read-out unit 300. The read-out unit 300 is described in more detail below with reference to FIG. 6.

In FIG. 1, the read-out unit 300 is shown as separate from the data driver 220 and the gate driver 230. However, that portion of the read-out unit 300 which receives the output signals of the first sensing units may be included in the gate driver 230, and that portion of the read-out unit 300 which receives the output signals of the second sensing units may be included in the data driver 220.

The first optical sensors M1 and the second optical sensors M2 may be TFTs, and in particular amorphous silicon (a-Si) TFTs. Further, the first and second optical sensors M1 and M2 may operate in a turn-off region. In other words, the bias voltage Vbias applied to the gate electrodes of all the optical sensors M1 and M2 may be such that the TFTs forming the first and second optical sensors M1 and M2 will operate in the turn-off region.

The operation of the TFTs forming the first and second optical sensors M1 and M2 will now be described in detail with reference to FIG. 3. The operating characteristics of these TFTs depend on their respective gate voltages Vgate. The gate voltage Vgate determines whether the respective first or second optical sensor M1 or M2 will operate in the turn-off region, a linear region, or a saturation region. In addition, the drain current Id of the first or second optical sensor M1 or M2 depends on the amount of external light received by the sensor's channel region.

In FIG. 3, the curve labeled as "Ibright" is the I-V curve (showing the variation of the drain current Id of each of the first and second optical sensors M1 and M2 with respect to the voltage Vgate) in a bright state, that is, when the respective channel region is exposed to external light. The curve "Idark" is the I-V curve (showing the variation in the drain current Id of each of the first and second optical sensors M1 and M2 with respect to the voltage Vgate) in a dark state, that is, when the respective channel region is not exposed to external light. Further, the label Id1 indicates the drain current of each of the first and second optical sensors M1 and M2 in the dark state when their gate voltage Vgate is at the value Vbias, and the label Id2 indicates the drain current of each of the first and second optical sensors M1 and M2 in the bright state when their gate voltage Vgate is at the value Vbias.

As shown in FIG. 3, when the TFT forming a first or second optical sensor M1 or M2 operates in the turn-off region, the current difference $\Delta Id=Id2-Id1$ between the drain currents Id2 and Id1 in the bright and dark states is relatively large. The TFTs can be placed into the turn-off region by appropriately selecting the voltage Vbias delivered to their gates.

As shown in FIG. 2, the second terminals of the first sensing units may be associated with (connected to) the respective capacitors Cx1 through Cxn, and the second terminals of the second sensing units may be associated with (connected to) the respective capacitors Cy1 through Cym. The capacitors Cx1 through Cxn and Cy1 through Cym accumulate electric charge received from the reset unit 240 which will be described later. The capacitors Cx1 through Cxn and Cy1 through Cym may be parasitic capacitances of the first and second sensing units. In particular, if the LCD 1 has a large size, then the first and second sensing units may be quite long since their lengths increase with the number of the first and second optical sensors M1 and M2. Therefore, the parasite capacitances of the first and second sensing units may be sufficient to accumulate adequate electric charge from the reset unit 240.

The reset unit 240 may include a plurality of switching devices M3 which are turned on by a reset start signal Vtri. When the switching devices M3 are turned on, the reset voltage Vdd provided to their source electrodes may propagate to the second terminals of the respective first and second sensing units. If the reset start signal Vtri is provided for a short period of time, the switching devices M3 will also be turned on for the short period of time. Thus, the reset voltage Vdd may be applied to the second terminals of the first and second sensing units in the form of a pulse voltage. As shown in the circuit diagram of FIG. 2, the switching devices M3 may be simultaneously turned on by the reset start signal Vtri.

The capacitors Cx1 through Cxn of the first sensing units and the capacitors Cy1 through Cym of the second sensing units may accumulate electric charge supplied by the switching devices M3 when the switching devices M3 are turned on, and may maintain the second terminals of the first and second sensing units at the reset voltage Vdd.

As described below, the sensor array 200 senses variations in the optical leakage current. This principle of operation can be implemented in a simple structure as shown in FIG. 2. Further, the simple structure has a small impact on the aperture ratio, and therefore the display quality of the LCD 1 is not strongly affected.

FIGS. 4 and 5 illustrate voltage changes at the second terminals of the first and second sensing units when one of the unit cells of FIG. 2 is touched by a user. The unit cell, illustrated in FIG. 4, is located at the intersection of an $x^{th}$ first sensing unit and a $y^{th}$ second sensing unit which have the respective output terminals Vxx and Vyy. When the user touches the unit cell, the unit cell is blocked from external light.

Referring to FIG. 5, the reset start signal Vtri is provided to each of the switching devices M3 of FIG. 2. The reset start signal Vtri rises to a voltage level Von which turns on the switching devices M3. The reset start signal Vtri then falls to a voltage level Voff which turns off the switching devices M3. The Von pulse of the reset start signal Vtri charges the second terminals of all the first and second sensing units to the reset voltage Vdd.

As described above with reference to FIG. 3, when a first or second optical sensor M1 or M2 operates in the turn-off region, the optical leakage current flowing through the optical sensor strongly depends on the amount of external light impinging on the sensor's channel region. Therefore, if a unit cell is touched, the drain current of the cell's first and second optical sensors M1 and M2 is reduced.

As stated above and illustrated in FIG. 2, each of the first sensing units includes serially connected first optical sensors M1, and each of the second sensing units includes serially connected second optical sensors M2. Therefore, the current through a first sensing unit is determined by the smallest of the drain currents of the unit's first optical sensors M1. Likewise, the current through a second sensing unit is determined by the smallest of the drain currents of the unit's second optical sensors M2.

Since the $x^{th}$ first sensing unit and the $y^{th}$ second sensing unit include the first and second optical sensors M1 and M2 of the touched unit cell, the current Ixx through the $x^{th}$ first sensing unit and the current Iyy through the $y^{th}$ second sensing unit are each equal to Id1, and this value is less than the value Id2 of the current through each of the other first and second sensing units, i.e. the sensing units which include only the untouched unit cells.

Due to the different currents, the voltage drop at each of the output terminals Vxx and Vyy of the $x^{th}$ first sensing unit and the $y^{th}$ second sensing unit (i.e. the units which include the touched unit cell) is smaller than at each of the output terminals of the first and second sensing units which only include the untouched unit cells. The different voltage drops can be used to sense the touch position.

The process illustrated in FIG. 5 may occur once in each frame. In particular, the reset voltage Vdd may be applied at the beginning of the frame, and the voltage changes at the output terminals of the first and second sensing units may be read out at the end of the frame.

The read-out unit 300 of FIG. 1 will now be described in more detail with reference to FIG. 6. The read-out unit 300 of FIG. 6 includes comparators 320 connected to the second terminals of the respective first sensing units, comparators 310 connected to the second terminals of the respective second sensing units, a multiplexer 330 which sequentially selects output signals of the comparators 310 and 320, an addressor which transmits timing signals Φreadl through Φread (m+n) to the multiplexer 330, and an amplifier 350.

The comparators 320 connected to the second terminals of the respective first sensing units compare output voltages of the first sensing units with a reference voltage Vcp and output the comparison results. The comparators 310 connected to the second terminals of the respective second sensing units compare output voltages of the second sensing units with the reference voltage Vcp and output the comparison results. The reference voltage Vcp may be set to a value between the output voltages of the first and second sensing units which include the touched unit cell of FIG. 5 and the output voltages of the first and second sensing units which do not include the touched unit cell.

The multiplexer 330 may receive the timing signals Φreadl through Φread (m+n) from the addressor 340 and sequentially output the respective output signals of the comparators 310 and 320.

The amplifier 350 amplifies the signals sequentially output from the multiplexer 330.

The read-out unit 300 senses the touch position as the region in which the first sensing unit having the smallest voltage change among the first sensing units intersects with the second sensing unit having the smallest voltage change among the second sensing units.

Further, the read-out unit 300 may sense a touch position in each frame. Thus, in some embodiments, the fifth timing signal TS5 (FIG. 1) is transmitted to the reset unit 240 at the start of each frame, and in response the reset unit 240 resets the second terminals of the first and second sensing units. At the end of each frame, the sixth timing signal TS6 is provided to the read-out unit 300, and in response the read-out unit 300 reads the voltages at the second terminals of the first and second sensing units. Sensing the voltage change in each frame allows a more reliable sensing of the touch position.

The touch position can be sensed by the read-out unit 300 analyzing a relatively small set of data, i.e. (m+n) data points for the terminals Vx1 through Vxn and Vy1 through Vym. In contrast, sensing the touch position based on the output of each unit cell would involve analyzing (m×n) data points. Therefore, in some embodiments of the present invention, the signal processing time can be reduced, and the read-out unit 300 can be smaller and simpler.

Figure 7:
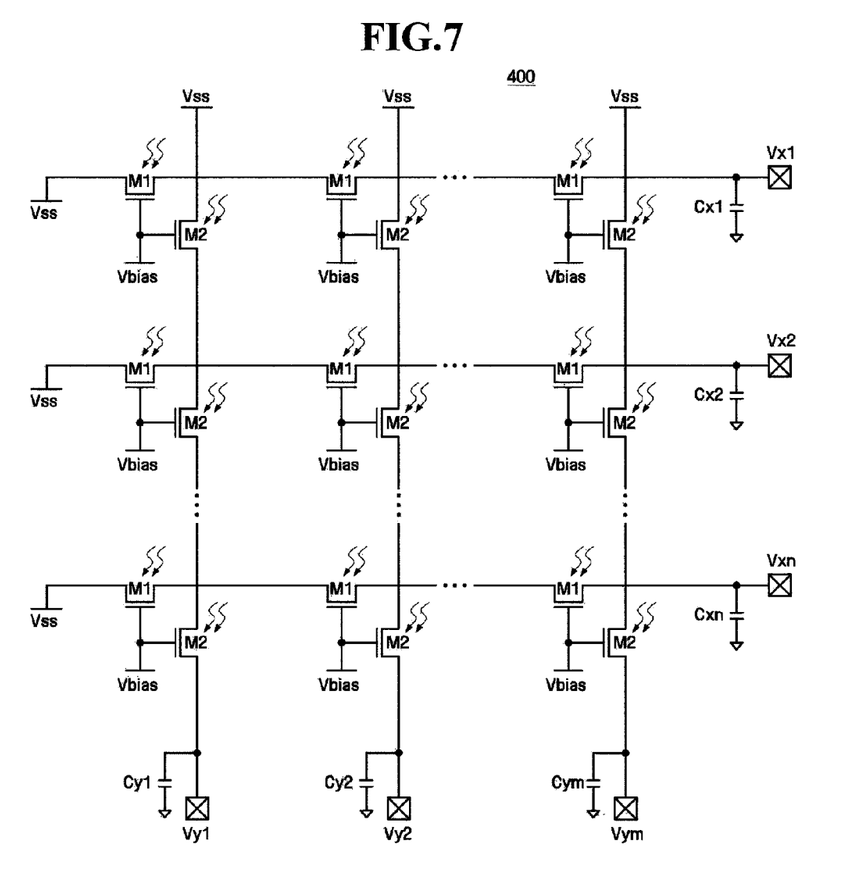
FIG. 7 is a circuit diagram of a sensor array included in an LCD according to a second exemplary embodiment of the present invention.
Figure 8:
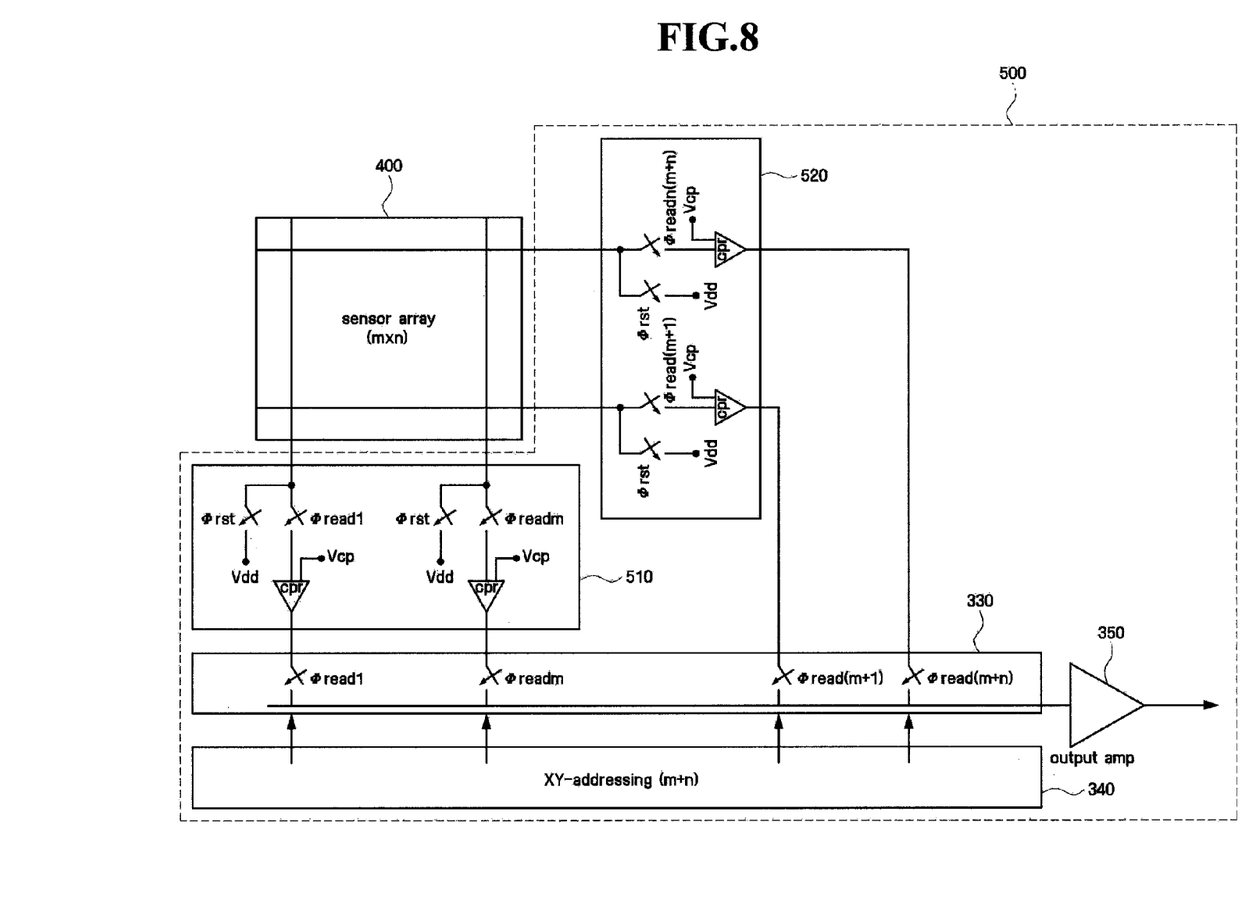
FIG. 8 is a block diagram of the sensor array and a read-out unit of the LCD of FIG. 7.

FIGS. 7 and 8 illustrate an LCD according to a second exemplary embodiment of the present invention For simplicity, elements substantially identical to those of the first exemplary embodiment are indicated by like reference numerals, and their redundant description will be avoided.

FIG. 7 is a circuit diagram of a sensor array 400 of the LCD of the second exemplary embodiment. FIG. 8 is a block diagram illustrating the sensor array 400 and a read-out unit 500. Unlike in the first exemplary embodiment, the reset unit of the LCD of the second exemplary embodiment is part of the read-out unit 500 instead of the sensor array 400. For example, as shown in FIG. 8, the reset unit may be included in the read-out unit 500 together with comparators 520 connected to second terminals of respective first sensing units and comparators 510 connected to second terminals of respective second sensing units. In FIG. 8, reset voltages Vdd may be simultaneously applied to the second terminals of the respective first and second sensing units in response to a reset signal Φrst. Thus, the reset signal Φrst may function as the reset start signal Vtri of the first exemplary embodiment.

Since the reset unit is included in the read-out unit 500 instead of the sensor array 400, the aperture ratio may be increased because the sensor array 400, which may reduce the aperture ratio, becomes smaller.

Figure 9:
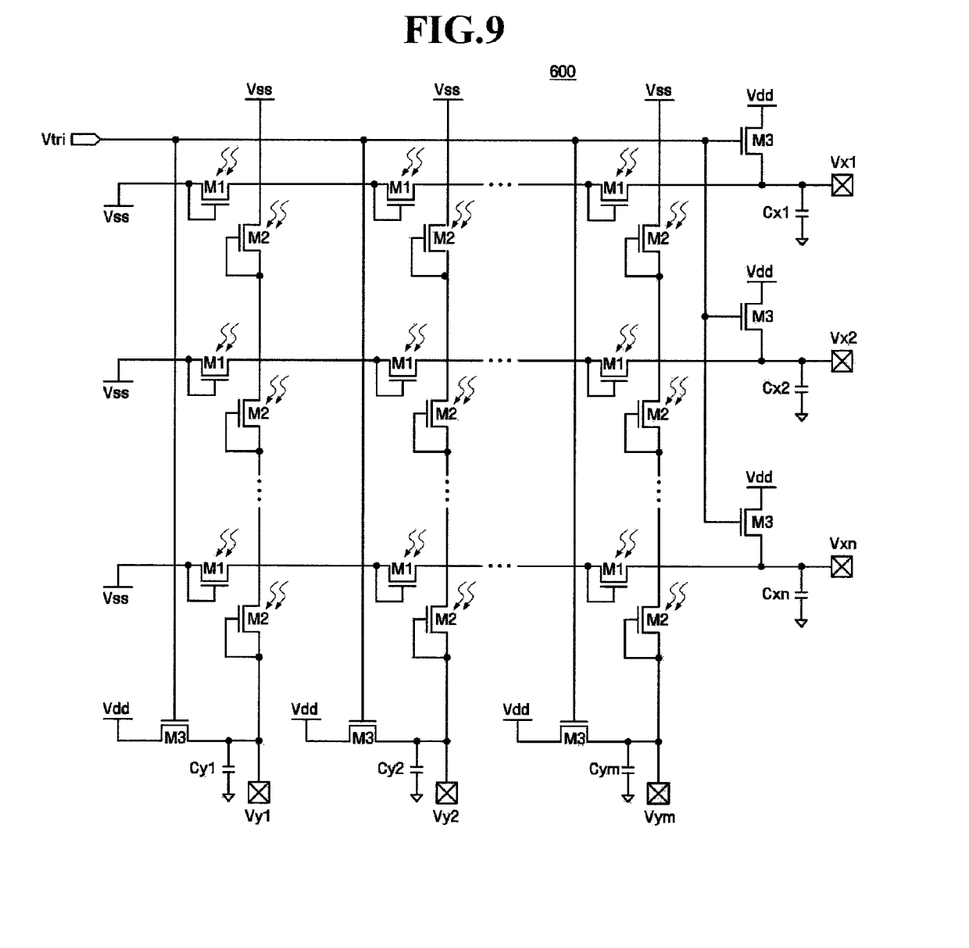
FIG. 9 is a circuit diagram of a sensor array included in an LCD according to a third exemplary embodiment of the present invention.

FIG. 9 is a circuit diagram of a sensor array 600 of an LCD according to a third exemplary embodiment of the present invention. For simplicity, elements substantially identical to those of the first exemplary embodiment are indicated by like reference numerals, and their redundant description will be avoided.

The sensor array 600 of FIG. 9 includes a plurality of first sensing units and a plurality of second sensing units. Each unit cell includes a first optical sensor M1 and a second optical sensor M2. In the example of FIG. 9, the first and second optical sensors M1 and M2 are MOS transistors. In each of these MOS transistors, the gate electrode is connected to the source electrode.

Therefore, at an operating point where the gate-to-drain voltage Vgd is 0 V, the optical leakage current flowing through each of the first and second optical sensors M1 and M2 strongly depends on the amount of external light impinging on the optical sensor's channel region.

Figure 10:
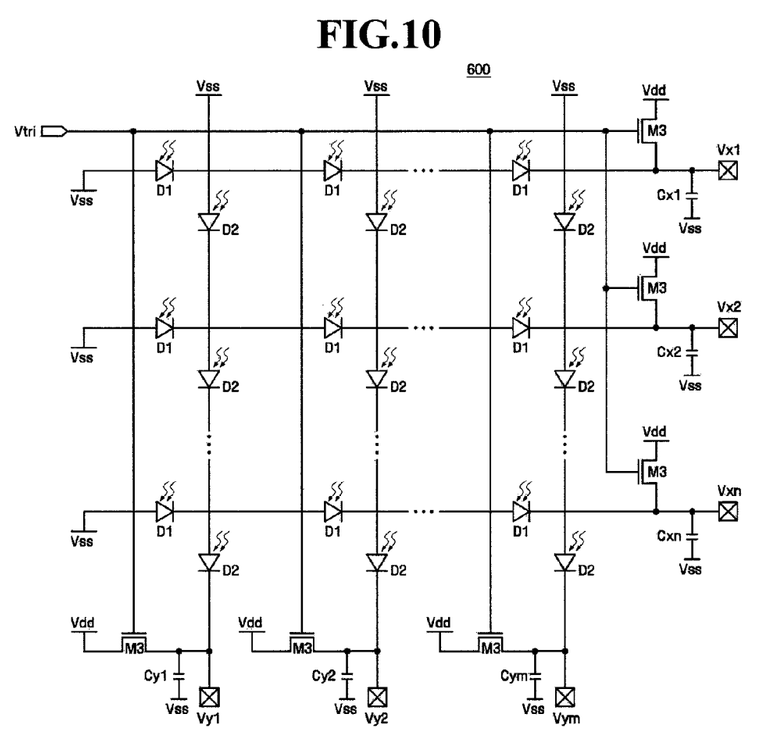
FIG. 10 is a circuit diagram of a sensor array included in an LCD according to a fourth exemplary embodiment of the present invention.

FIG. 10 is a circuit diagram of a sensor array 700 of an LCD according to a fourth exemplary embodiment of the present invention. For simplicity, elements substantially identical to those of the first exemplary embodiment are indicated by like reference numerals, and their redundant description will be avoided.

In FIG. 10, the first and second optical sensors D1 and D2 may be photodiodes or photo conductors for example. The current flowing through each photodiode or photo conductor depends on the degree of exposure of the photodiode or photo conductor to light. The current is higher in a bright state than in a dark state. Therefore, the photodiodes or photo conductors may function as the MOS transistors chosen for the first and second optical sensors M1 and M2 in the sensor array 200 of FIG. 1. Since photodiodes and photo conductors are widely known, their detailed description is omitted.

The embodiments described above do not limit the present disclosure of invention and instead provided illustrative examples.

What is claimed is:

1. A display device comprising:
   a plurality of first sensing units, each first sensing unit comprising a plurality of first optical sensors connected in series to each other, each first sensing unit comprising a respective first terminal which is coupled to receive a first voltage and to apply the first voltage to a corresponding first end of the series of first optical sensors, the respective first optical sensors of each first sensing unit being distributively disposed along a line extending in a first direction, each first sensing unit comprising a respective second terminal coupled to a respective second end of the series of first optical sensors;
   a plurality of second sensing units, each second sensing unit comprising a plurality of second optical sensors connected in series to each other, each second sensing unit comprising a respective first terminal which is coupled to receive a second voltage and to apply the second voltage to a corresponding first end of the series of second optical sensors, the respective second optical sensors of each second sensing unit being distributively disposed along a line extending in a second direction transverse to the first direction, each second sensing unit comprising a respective second terminal coupled to a respective second end of the series of second optical sensors;
   the transverse pluralities of series of the first and second optical sensors defining a matrix;
   a reset unit operatively coupled to the respective second terminals of each of the first and second sensing units and structured to apply a predetermined reset voltage to the respective second terminals of each of the first and second sensing units; and
   a read-out unit operatively coupled to the respective second terminals of each of the first and second sensing units and structured to sense a light obstructing touch position within the matrix based on voltage differences at the second terminals of the first and second sensing units relative to the predetermined reset voltage.

2. The display device of claim 1, wherein the first and second optical sensors are amorphous silicon (a-Si) thin-film transistors (TFTs).

3. The display device of claim 1, wherein the first and second optical sensors are TFTs.

4. The display device of claim 3, and further comprising biasing circuitry coupled to cause the first and second optical sensors to operate in respective, sub-threshold turn-off regions thereof.

5. The display device of claim 3, wherein an optical leakage current of each said optical sensor depends on an amount of external light impinging on the optical sensor's channel region, and said voltage differences at the second terminals of the first and second sensing units relative to the predetermined reset voltage depend on the optical leakage currents of the respective optical sensors.

6. The display device of claim 1, wherein the reset unit is configured for applying the reset voltage in the form of a pulse voltage at the beginning of a display frame, and the read-out unit is configured for sensing the touch position based on the voltage differences at the second terminals during the frame.

7. The display device of claim 1, wherein the first and second optical sensors are photodiodes or photo conductors.

8. The display device of claim 1, wherein the reset unit comprises a plurality of switching devices which, when turned on by a reset start signal, apply the reset voltage to the second terminals of the first and second sensing units.

9. The display device of claim 8, wherein the switching devices each includes a transistor having a respective gate electrode, a respective drain electrode and a respective source electrode and wherein the reset start signal is transmitted to a gate electrode of each of the switching devices, the reset voltage is applied to a drain electrode of each of the switching devices, and the second terminal of each of the first and second sensing units is connected to a source electrode of a respective one of the switching devices.

10. The display device of claim 1, wherein the reset unit comprises switching devices for supplying electric charge to each of the first and second sensing units, and each of the first and second sensing units is associated with a capacitor for accumulating the electric charge.

11. The display device of claim 10, wherein the switching devices are simultaneously turned on by the reset start signal.

12. The display device of claim 10, wherein the associated capacitor is parasitic capacitor of the respective first or second sensing unit.

13. The display device of claim 1, wherein the read-out unit comprises:
a plurality of comparators connected to the second terminals of the respective first and second sensing units; and
a multiplexer connected to the comparators, for sequentially outputting output signals of the respective comparators.

14. The display device of claim 13, wherein the read-out unit further comprises an addresser for transmitting a plurality of timing signals to the multiplexer at the end of a frame.

15. A display device comprising:
a plurality of sensing units each of which comprises a series connected plurality of optical sensors each configured so as to operate in a sub-threshold turn-off region of the respective optical sensor, each said sensing unit having a respective capacitor which is coupled so as to be charged to a first voltage level and to thereafter be discharged by its corresponding, series connected optical sensors, where said discharge is a relatively rapid one if its corresponding, series connected optical sensors are subjected to a first light, or a comparatively slower one if the corresponding optical sensors are subjected to a second light, wherein the first light is brighter than the second light;
a reset unit which is configured to apply a reset voltage to each of the sensing units for thereby charging the respective capacitor of the sensing unit to said first voltage level; and
a read-out unit which is configured to sense a light-obstructing touch position within the plurality of sensing units based on the altered rate of voltage discharge caused by touching at least one of the optical sensors and thereby altering its respective current conduction,
wherein the each of the plurality of the optical sensors comprises a first terminal and second terminal and the first terminal of one of the optical sensors is connected to the second terminal of another of the optical sensors, and
wherein the respective series-connected pluralities of optical sensors of respective subsets of the sensing units respectively extend in different directions as strings of spaced apart optical sensors within each series.

16. The display device of claim 15, wherein the optical sensors are a-Si TFTs.

17. The display device of claim 15, wherein the reset voltage is for being applied in the form of a pulse voltage at the beginning of a frame, and the read-out unit is for sensing the touch position based on the voltage changes during the frame.

18. A method of driving a display device, the method comprising:
biasing each of a series-connected plurality of spaced apart optical sensors included in each of a plurality of sensing units provided within the display device so that the biased optical sensors each operates in a sub-threshold turn-off region of its operating characteristics;
applying a reset voltage to an end terminal of the series-connected and spaced apart optical sensors of each of the sensing units;
after applying the reset voltage, causing at least one of the series-connected plurality of optical sensors to discharge a respective capacitance of the at least one series-connected plurality of sensing units according to levels of light applied to the at least one series-connected optical sensors of the respective sensing units; and
determining a touch position among the spaced apart optical sensors based on sensed voltage changes at the end terminals of the sensing units,
wherein the series-connected pluralities of spaced apart optical sensors extend in different directions.

19. The method of claim 18, wherein the reset voltage is applied in the form of a pulse voltage at the beginning of a display frame, and the touch position is determined based on the voltage changes during the frame.

20. The method of claim 18, wherein the touch position is determined as a region of intersection of two sensing units which have the smallest voltage changes from among the sensing units.

21. A touch detecting display device comprising:
a substrate having an array of image forming pixel units;
a first plurality of photosensors connected in series, the first plurality of photosensors being distributively disposed on the substrate along a first path extending in a respective first direction;
a second plurality of photosensors connected in series, the second plurality of photosensors being distributively disposed on the substrate along a second path extending in a respective second direction different from the first direction;
a first capacitor operatively coupled so as to be discharged with use of a corresponding first discharge current flowing serially through the series connected first plurality of photosensors; and
a second capacitor operatively coupled so as to be discharged with use of a corresponding second discharge current flowing serially through the series connected second plurality of photosensors.

22. A method of operating a touch detecting display device where the device comprises:
a substrate having an array of image forming pixel units;
a first plurality of photosensors connected in series, the first plurality of photosensors being distributively disposed on the substrate along a first path extending in a respective first direction; and
a second plurality of photosensors connected in series, the second plurality of photosensors being distributively disposed on the substrate along a second path extending in a respective second direction different from the first direction;

the method comprising:
- discharging a first capacitor with use of a corresponding first discharge current that flows serially through the series connected first plurality of photosensors; and
- discharging a second capacitor with use of a corresponding second discharge current that flows serially through the series connected second plurality of photosensors.

* * * * *